Jan. 12, 1971   H. R. GEUL   3,554,023
ROLLER TESTING STAND FOR MOTOR VEHICLES
Filed Nov. 12, 1968   3 Sheets-Sheet 1
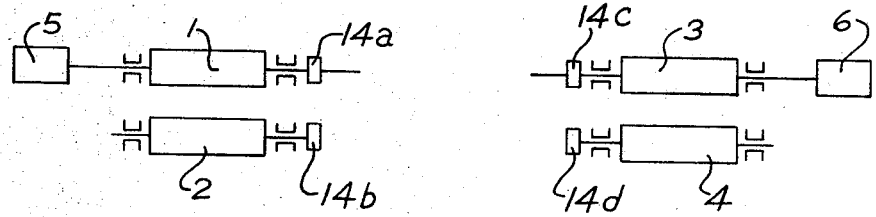
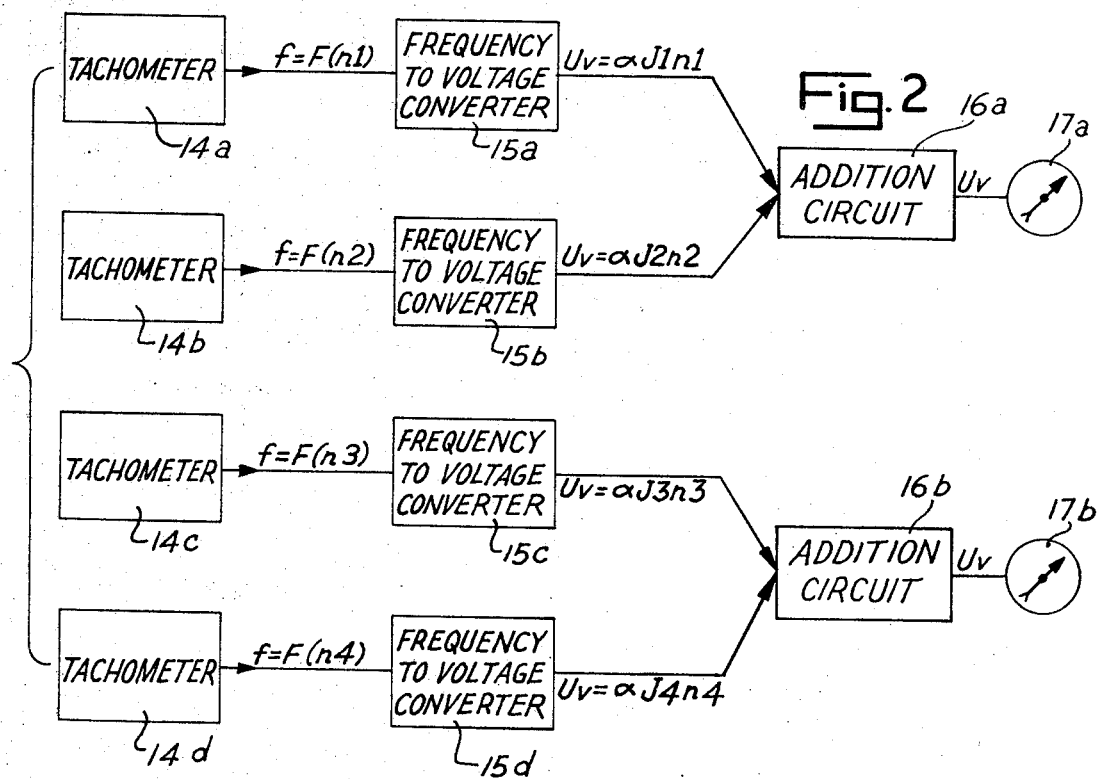
INVENTOR.
HERMAN R. GEUL
BY
ATTORNEYS

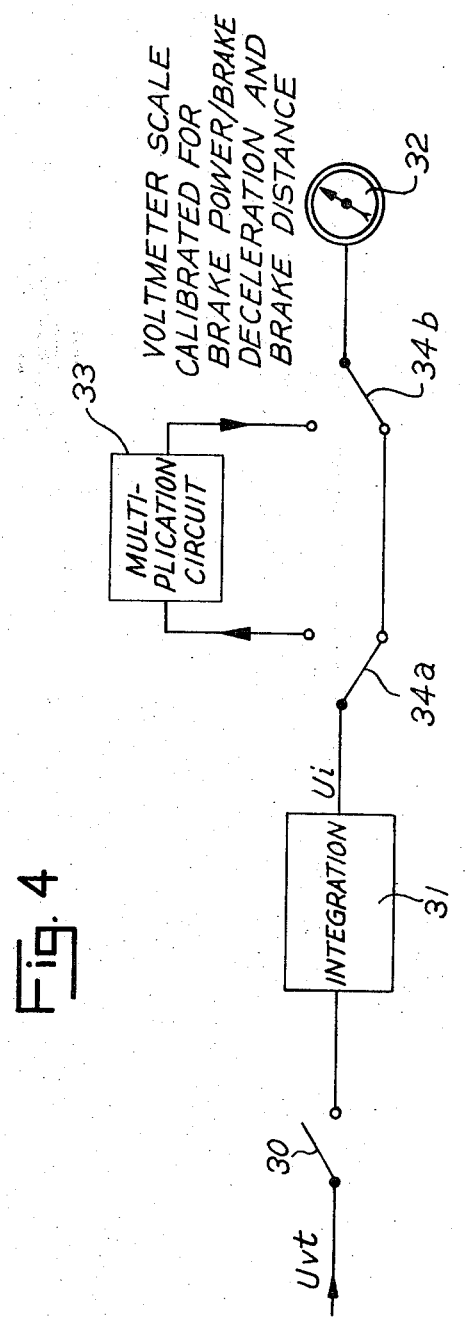

3,554,023
ROLLER TESTING STAND FOR MOTOR VEHICLES
Herman R. Geul, Leiden, Netherlands (% Sun Electric
 (Nederland) N.V., Ariana Nozemanstraat 8, Amster-
 dam, Netherlands)
Filed Nov. 12, 1968, Ser. No. 775,037
Claims priority, application Netherlands, Nov. 14, 1967,
6715398
Int. Cl. G01l 5/13
U.S. Cl. 73—117　　　　　　　　　　　　　　8 Claims

ABSTRACT OF THE DISCLOSURE

A roller testing stand for motor vehicles comprising independently rotating rollers which can be driven by means of driving motors, each of such independent rollers driving a tachometer for providing an output signal proportional to the speed of the roller in which the respective output voltages of the right and left rollers are treated independently of each other in electronic differentiating and integrating circuits to provide full information about the vehicle brake characteristics.

BACKGROUND OF THE INVENTION

Roller testing stands generally are known for the testing of motor vehicles. The known roller testing stands have a number of disadvantages which restrict their use. For example, they lack the ability to provide information about momental values of brake power and brake retardation of both the brakes (left and right) of a vehicle which are tested simultaneously as well as about differences in these values might occur during the tests.

It is one object of the present invention to improve these roller testing stands, and to provide a new and highy advantageous roller testing stand in which all the obtained measuring values are treaed electronically and in such a way that not only full information is obtained about the characteristics of the brakes of the vehicle as a whole, but also about the behavior of each brake independent of the other and at very moment of the test.

SUMMARY OF THE INVENTION

In accordance with the principles of the invention, the improved roller testing stand is characterized in that the respective output signals of the tachometers are treated independently of each other by electronic integration and/or differentiation circuits to obtain information relating to the effective and momental values of the brake retardation and the respective braking forces regarding the relative systems, as well as relating to the differences in braking forces and brake retardation existing between said systems.

As explained in greater detail hereinbelow, this treatment of the tachometer signals, which can be effected with various types of known electronic circuitry, makes it possible to obtain much information from the signals so that a complete insight and analysis in the behavior of the brakes of the vehicle is obtained. For measuring the total effective braking forces, the signals are integrated to the time independently of each other by means of integrating circuits, taking into account integrating factors which are dependent upon the mass inertia of the rotating systems, said integrating circuits being started in response to a control signal that is given when the driving motors of the rotating systems are not operative any more and being stopped at the moment at which the rollers are brought to a standstill. In this way, it is possible to determine the distance covered by a point on the rollers from the moment at which the driving motor has switched off until the moment of standstill. When the information thus obtained is multiplied by a factor which is proportioned to the weight of the vehicle and inversely proportional to the inertia of the rotating masses of the rollers, the braking distance which the vehicle would cover on the road can be determined and the mean brake retardation can be ascertained.

Preferably the motors drive the rollers with a substantially constant speed while for each motor a device is provided eliminating the driving effect of the associated motor when the driving torque applied by this motor exceeds a predetermined value. In this way overloading of the motor is avoided and it becomes possible to use high speed motors so that the circumstances which in practice occur, like braking a heavy motor vehicle from a high speed giving an extremely high loading of the brake, can be imitated.

It also is possible to switch off the motors which drive the rollers, when a certain previously adjusted value of the brake power is exceeded. In this way, the maximum driving torque of the motors is never exceeded.

In one illustrative embodiment of the roller testing stand according to the invention the tachometer of the left-hand roller system supplies a first output signal and the tachometer of the right-hand roller system supplies a second output signal, said first and second output signals being differentiated independently of each other to obtain output signals, respectively representing the deceleration forces acting upon the two rollers systems, while in each differentiating circuit a differentiating constant is introduced which is chosen, in dependence upon the inertia of the respective masses of the rotating systems, in such a way that the output signals of the respective differentiating circuits are of a comparable order.

By this means at each moment information is obtained about the deceleration forces. The fact that the output signals of the differentiating circuits are of a comparable order makes it possible to add these signals resulting in a signal representing the total forces, while furthermore the signals may be subtracted from each other resulting in a signal representing the differences in brake power between the two brakes.

To obtain signals which represent the total brake power effected by the left-hand brake and the right-hand brake of the vehicle, respectively, the roller testing stand of the present invention is provided with a circuit for obtaining a signal representing the driving torque of the motor driving the left-hand and right-hand roller systems, respectively, which signals are added to the respective output signals of the differentiating circuits for obtaining output signals representing the total braking force exerted by the left-hand and right-hand brake, respectively.

Advantageously, a multiplying circuit can be used to which the signals representing the total brake power can be supplied in order to be multiplied by a factor which is proportional to the transformed mass of the rotating system and inversely proportional to the weight of the vehicle. A signal is thereby obtained representing the momental brake retardation.

The inventive roller testing stand can also be provided with a memory circuit for storing the maximum values of the signals representing the brake power and brake retardation. In this way the maximum values of brake power and brake retardation which have occurred during the test may be ascertained.

BRIEF DESCRIPTION OF THE DRAWINGS

The above described and other objects and features of the present invention are set forth in greater detail in the following specification and claims. In order that the said invention may be clearly understood and readily carried into effect, a preferred embodiment of the same will now be described more fully with reference to the accompanying drawings, in which:

FIG. 1 shows an illustrative schematic view of a roller testing stand according to the invention;

FIG. 2 shows the overall circuit of the electonic circuits employed for determining the speed of the rollers;

FIG. 4 shows an overall circuit of the circuits for measuring the average brake power, slowing down effect of the brakes, respectively and the braking distance of a vehicle to be tested.

Figure 3:
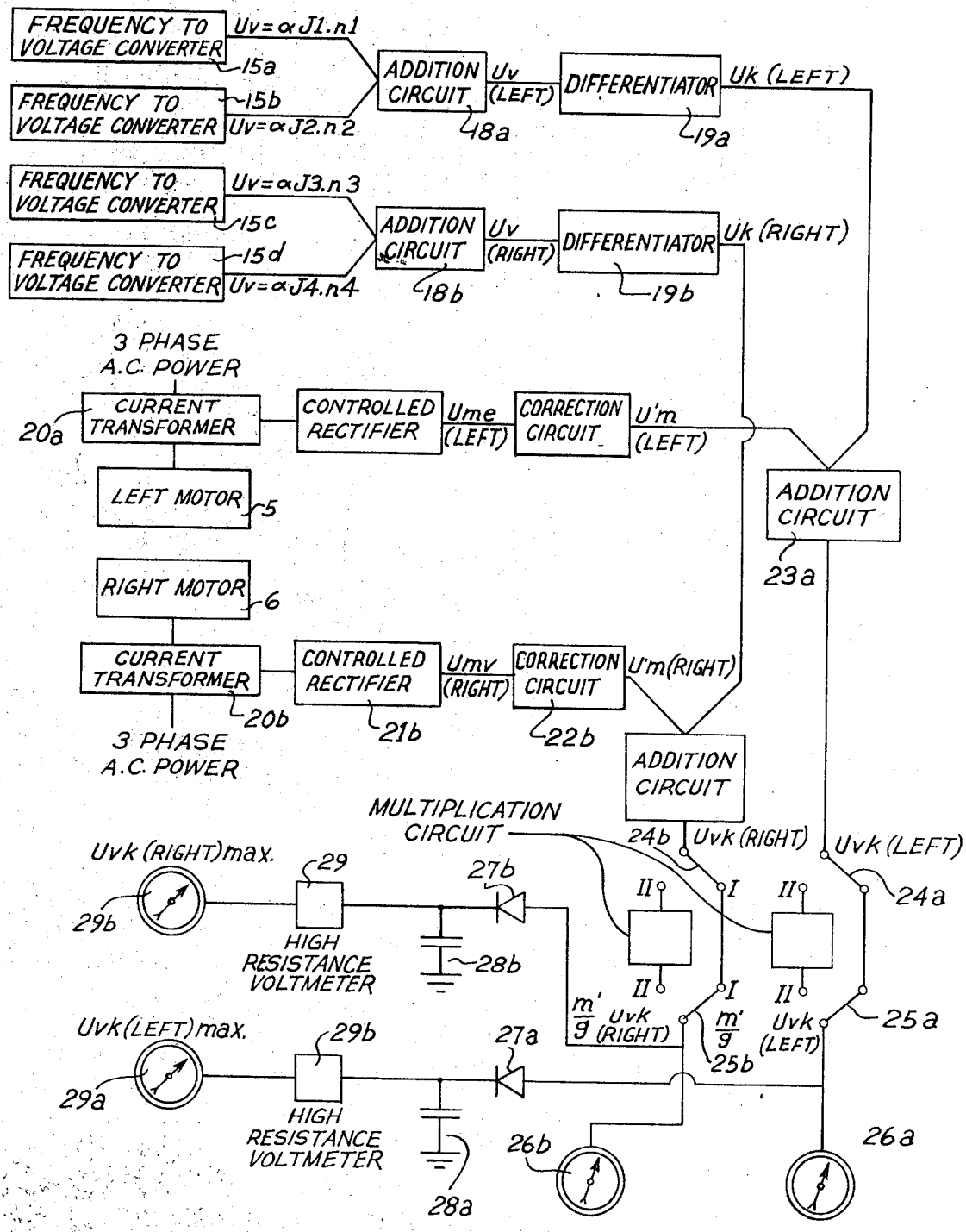
FIG. 3 shows the overall circuit of the electronic circuits for determining the brake power, the slowing down effect of the brakes, respectively of a vehicle to be tested.

Referring now to the drawing, the illustrative roller testing stand schematically represented in FIG. 1 comprises four rollers 1, 2, 3 and 4, of which the rollers 1 and 2 are combined to form a left-hand roller pair, while the rollers 3 and 4 are combined to form a right-hand roller pair. The rollers 2 and 4 are supported for free rotation as are the rollers 1 and 3, the left-hand roller 1 of the latter pair, however, being coupled to a three phase alternating current motor 5, while the roller 3 is coupled to a three phase alternating current motor 6. Finally, each of the rollers 1, 2, 3 and 4 drives a tachometer feeder 14a, 14b, 14c and 14d, respectively, which advantageously may be of the photoelectric type or any other suitable type.

It will be appreciated by those skilled in the art that the use of four rollers has the advantage that the vehicle to be tested is fixed in a simple way on the testing stand. The fact that a tachometer is used with each roller allows for more exact measurement on testing the brakes since, as occurs in practice, the results of measurement are not impaired even when a wheel is no longer in contact with one of the rollers.

The tachometer feeders 14a to 14d supply an alternating voltage, the frequency of which is a function of the speed of the relative roller. As is apparent from FIG. 2, the output voltage of each tachometer feeder is supplied to a frequency to voltage converter, 15a to 15d, respectively. Each converter supplies an output voltage which is not only proportional to the frequency of the relative tachometer signal, and therefore to the number of revolutions per minute of the associated roller, but also to a constant of proportion $\alpha$ and to the mass inertia moment of the associated roller.

The output voltages of the converters 15a and 15b are supplied to an adding circuit 16a, which supplies an output voltage to the voltmeter 17a which represents the speed of the left-hand rollers. The output voltages of the converters 15c and 15d are fed to the adding circuit 16b which supplies an output voltage to the voltmeter 17b which gives an indication of the speed of the right hand rollers. The constant of proportion $\alpha$ is selected in such a way that at identical circumferential speeds of the rollers the output voltages Uv of the adding circuits represent the circumferential speed of one roller. The voltmeters 17a and 17b advantageously are provided with scales calibrated in speed units.

It will be appreciated by those skilled in the art that the invention makes it also possible to couple the two right-hand rollers with each other, as well as the left-hand rollers. Then, at each side, one tachometer can be omitted. The adding circuits 16a and 16b then can also be omitted.

When a roller is accelerated or decelerated, the force acting upon the rollers is expressed by the equation $$K = J \frac{d}{dt}$$

By making the output voltage of the transformers 15a, 15b, 15c and 15d dependent upon the inertia moment of the relative rollers, a signal representing the acceleration and deceleration respectively is directly obtained due to the differentiation of the output voltage of the relative rollers. It is clear that it also is possible on differentiating to introduce a differentiating factor representing the inertia moment when the speed signals Uv are independent of the mass inertia moment.

In order to test the brake of a motor vehicle the rollers are driven by means of the motors 5 and 6. The speed of the rollers and the wheels of the vehicle is increased to a certain value at which time the brakes are activated. The brake power exerted by the brakes should overcome the torque supplied by the motor and the internal inertia torque supplied by the rotating masses of the rollers.

FIG. 3 shows a general diagram of a preferred illustrative embodiment of the electronic circuits which may be used for determining the brake power and the slowing down effect of the brake.

In order to determine the forces required for overcoming the internal inertia moment of the rollers, the output voltages of the converters 15a and 15b, pertaining to the two left-hand rollers and for each of which the equation: $Uv = (\alpha)(J)(n)$ is valid, are added in an adding circuit 18a to produce an output voltage Uvl which is differentiated in the differentiating circuit 19a, resulting in an output voltage Ukl. The same holds true for the output voltages of the converters 15c and 15d, which via the adding circuit 18b and the differentiating circuit 19b, are converted into an output voltage Ukr. These voltages, which are a measure for a part of the brake power exerted, are utilized in the manner further described hereinbelow.

The motors driving the rollers 1 and 3 are three phase alternating current motors having a constant speed. In order to obtain an output signal which is a measure for the torque supplied by the motors, the motors 5 and 6 are fed via the current transformers 20a and 20b, respectively. Signals are obtained from the current transformers which via the switched controlled rectifier circuits 21a and 21b, respectively, separating the watt component of current from the wattless component, are fed to the correction circuits 22a and 22b, respectviely. In these circuits the output voltages Uml and Umr are corrected, taking into account the motor losses and the motor characteristics.

The resulting output voltages Uml, Umr, respectively represent the torque supplied by the respective motors and, since the radius of the rollers is constant and can be introduced as a correction factor, represent the forces exerted on the wheels.

The output voltages Ukl and Uml, thus obtained, are added in the adding circuit 23a, and the output voltages Ukr and Umr are added in the adding circuit 23b. The output voltages obtained are a direct measure for the brake power exerted by the left-hand brake and right-hand brake, respectively, and these voltages are supplied to the voltmeters 26a and 26b via the changeover switches 24a, 24b and 25a, 25b. The scales of the voltmeters being calibrated are in brake power units. In the position of the switches as represented in FIG. 3, the brake powers exerted by the left-hand and right-hand brakes, respectively, are indicated.

The decelerating effect attainable with a vehicle is inversely proportional to the weight of the vehicles to be tested. Thus, it becomes possible to multiply the voltages Urkr and Urkl by a definite factor in order to obtain output voltages which are directly proportional to the decelerating effect of the brake obtained with the vehicle under test. For that purpose, this voltage is multiplied by an adjustable factor M'/G. In this relation M' represents the masses of the rotary systems of the roller testing stand transformed into translation and G is the weight of the vehicle. When the changeover switches 24a, 24b and 25a, 25b are moved into the position II, a similar multiplication of the voltages Urkl and Urkr is effected, the voltmeters indicating directly the attainable decelerating effect of the brake.

The test stand of the present invention may further be provided with two memory circuits by the aid of which the maximum value of the brake power and decelerating effect of the brake, respectively, can be stored. Each of these memory circuits advantageously comprises a diode such as 27a and 27b, respectively, by means of which the signals in question charge the condensers 28a, 28b, respectively. The voltages on these condensers are indicated by the high ohmic voltmeters 29a, 29b, respectively, indicating directly the maximal values produced.

The motors 5 and 6 are provided with an overloading safety by means of which the motors are automatically switched off when one of the voltages representing the brake power becomes too high. This means that in such a case the voltage U$ml$ or U$mr$ falls back to zero, but, since the rollers have a certain rotational energy, the measurement of the brake power continues normally. On effecting the measurement of the brake power it is preferable to start by braking lightly in opposition to the driving motors, in which case a clear understanding is obtained with respect to the behavior of the brakes on braking lightly. It also is possible to realize a definite preheating of the brakes in this way by braking for a longer time whereby the circumstances prevailing in practice can be simulated.

With the conventional roller testing stand it is not possible to reproduce the circumstances prevailing in normal use on reducing the speed of a heavy motorcar from e.g. 160 km./h. to zero, since the rollers cannot be rotated at the high speed required therefore and lack sufficient mass. It is possible, however, to calculate the total quantity of energy released at such a braking operation and to make the brakes exert a certain brake power during a previously determined period. Thereupon the brakes can be operated vigorously and the braking power produced thereby be measured.

When the brakes are strongly applied, the overloading safety will switch off the motor. The energy stored in the rollers is then destroyed and the voltages U$kl$ and U$kr$ supply a measure for the brake power and decelerating effect of the brake, respectively.

In the conventional roller testing stands with two interconnected left-hand rollers and right-hand rollers, respectively, inaccuracies in the ascertainment of the brake power occur when, on braking strongly, the wheels are no longer in contact with the forward rollers. In the improved roller testing stand of the present invention the wheels will however remain in contact with the rear rollers which via the tachometers keep feeding a signal representing the decelerating forces. Due to the adding of the signals of the two rollers, the measurement of the brake power remains exact and correct. Even when at first the rear roller would be braked and thereafter the front roller, the measurement remains correct.

The roller testing stand may be provided with a measuring device by means of which the average brake power and decelerating effect of the brake, respectively can be ascertained on operating the brakes. This measurement is based on the following principle:

At the moment that the electric motors 5 and 6 are switched off, owing to the brake power exceeding a definite maximal value, the switch 30 is closed (see FIG. 4) and the speed signal U$vt$ is supplied to an electronic integrator 31 [the speed signals U$v$ (left-hand) and U$v$ (right-hand), respectively to two separate integrators] integrating this signal to the time.

When the rollers have stopped, the output voltage U$i$ of the integrator is a measure for the distance covered by a point situated on the circumference of the rollers between the moment when the motors are switched off and the moment when the rollers stand still, according to the equation:

$$U_i = \frac{1}{\tau} \int_{t_1}^{t_2} U_{vt} dt$$

U$vt$ is a function of the velocity V of a point on the circumference of the rollers, so it also can be stated:

$$U_i = \gamma \int_{t_1}^{t_2} V dt$$

On decelerating, V on its turn is again a function of $t$ according to the equation $V = V_0 - at$ in which $a$ is the decelerating and $V_0$ the initial velocity at the time $t_1$, so $$U_i = \gamma \int_{t_1}^{t_2} (V_0 - at) dt$$

Assuming that $t_1 = 0$ and $V = 0$ at the time that $t = t_2$, so $t = V_0/a$ and $$U_i = \gamma \int_0^t (V_0 - at) dt = \gamma (V_0 t - \frac{1}{2} at^2)$$
$$= \gamma (V_0^{2/a} - V_0^{2/2a}) = \gamma V_0^{2/2a}$$

When three phase alternating current motors are used $V_0$ is almost constant and $U_i$ therefore is only proportional to $1/a$ and therefore inversely proportional to the decelerating force K which has been operative in the period between $t_1$ and $t_2$. When K is variable during this period, then $1/U_i$ represents the average (by time) brake power K produced. If a voltmeter 32 is provided with a reciprocal scale and is suitably calibrated, the brake power can be read from this voltmeter. This measuring device is furthermore provided with a circuit 33, which via the switches 34a, 34b can be switched on, whereby U$i$ can be multiplied by a factor $G/m$, in which G represents the weight of the car and $m'$ represents the mass of all rotary systems together transformed into translation. The reciprocal scale on the voltmeter may be used for reading in meters per second $^2$ a deceleration to which the motorcar would be subjected by equivalent braking on the road due to the brake power of the relative wheels. The total slowing down effect of the brake is obtained by a summation of the slowing down effect of the brakes attained per wheel or pair of wheels.

The voltmeter can also be provided with a scale calibrated in meters of the braking distance, for U$i$ represents essentially the distance covered of a point of the rollers and U$i$ multiplied by $G/m'$ is a value representing the braking distance of the car on operating the brakes on the road if in an equivalent way the brakes are tightened.

Braking distance is understood to be the distance covered if the car would only be braked by the wheels tested.

If it would be desired to know the real braking distance this $S_{total} = S_t$ is obtained by calculating $$\frac{1}{S_t} = \frac{1}{S_v} + \frac{1}{S_a}$$

in which $S_v$ and $S_a$ are the indicated braking distances of the front and rear wheels separately.

While there has been described what at present are considered to be the preferred embodiments of the invention, it will be apparent to those skilled in the art that various changes and modifications may be made therein without departing from the principles of the invention and therefore it is intended that the appended claims shall cover all changes, modifications and other embodiments which fall within the true spirit and scope of the invention.

The embodiments of the invention in which an exclusive property or privilege is claimed are defined as follows:

1. An improved roller testing stand for motor vehicles, and particularly for testing the brakes thereof, comprising two or more systems of independently rotating rollers, driving motors for driving said rollers, tachometer means operatively coupled to the rollers of each such independent system for providing an output signal proportional to the speed of said system, electronic computing circuits connected to receive said output signals such that the respective output signals of the tachometer means are treated independently of each other by said electronic computing circuits connected to provide information signals representing the effective and momental values of the brake retardation and the respective braking forces regarding the relative systems, as well as the differences in braking forces and brake retardation existing between said systems, said electronic computing circuits comprising integrating circuits for integrating with respect to time the signals for measuring the total effective braking forces, independently of each other, taking into account integrating factors, which are dependent upon the mass inertia of the rotating systems, and means for providing a control signal, said integrating circuits being started in response to said control signal which is provided when the driving motors of the rotating systems are not operative anymore, and which is stopped at the moment on which the rollers are brought to a standstill.

2. An improved roller testing stand in accordance with claim 1 wherein said information signals are multiplied by a factor which is proportional to the weight of the vehicle and inversely proportional to the rotating masses.

3. An improved roller testing stand in accordance with claim 1 wherein said driving motors drive the rollers with a substantially constant speed, and further comprising means connected to each motor for eliminating the driving effect of the associated motor when the driving torque applied by the motor exceeds a predetermined value.

4. An improved roller testing stand in accordance with claim 1 further comprising means for switching off the motors driving the rollers when a definite previously adjusted value of the brake power is exceeded.

5. An improved roller testing stand in accordance with claim 1 wherein the tachometers of one roller system supplies a first output signal and the tachometers of another roller system supplies a second output signal, said first and second output signals being differentiated independently of each other in order to obtain output signals representing the decelerating forces acting upon the roller systems in each differentiating circuit and means for introducing a differentiating constant which is chosen in dependence upon the inertia of the respective masses of the rotating systems in such a way that the output signals of the respective differentiating circuits are of a comparable order.

6. An improved roller testing stand in accordance with claim 5 further comprising circuit means for providing signals representing the driving torque of the motor driving the respective roller systems, and means for adding such signals to the respective output signals of the differentiating circuits for providing output signals representing the total braking force exerted by the left and right brakes, respectively, of the motor vehicle.

7. An improved roller testing stand in accordance with claim 6 further comprising a multiplying circuit to which the signals representing the total brake power can be supplied in order to be multiplied by a factor which is proportional to the transformed mass of the rotating system and inversely proportional to the weight of the vehicle whereby a signal representing the momental brake retardation is obtained.

8. An improved roller testing stand in accordance with claim 7 which further comprises a memory circuit for storing with maximum values of the signals representing the brake power and the brake retardation.

References Cited

UNITED STATES PATENTS

| | | | |
|---|---|---|---|
| 1,838,414 | 12/1931 | Langbein | 73—126 |
| 3,286,517 | 11/1966 | Ostrander | 73—117 |
| 3,289,471 | 12/1966 | Maxwell | 73—117 |

JERRY W. MYRACLE, Primary Examiner

U.S. Cl. X.R.

73—126